United States Patent [19]

Barbier

[11] Patent Number: 5,847,916

[45] Date of Patent: Dec. 8, 1998

[54] PROTECTOR

[75] Inventor: Jacobus T. Barbier, Calgary, Canada

[73] Assignee: Circa Enterprises Inc., Calgary, Canada

[21] Appl. No.: 577,841

[22] Filed: Dec. 22, 1995

[51] Int. Cl.⁶ ........................................ H02H 1/00
[52] U.S. Cl. .............................. 361/119; 361/56; 361/111
[58] Field of Search .................................. 361/119, 118, 361/56, 91, 111

[56] References Cited

U.S. PATENT DOCUMENTS 3,587,021  6/1971  Baumbach ................................. 337/32

Primary Examiner—Jeffrey A. Gaffin
Assistant Examiner—Stephen Jackson
Attorney, Agent, or Firm—Baker & Daniels

[57] ABSTRACT

A protector for use in a telecommunications system to establish an electrical connection between two lines includes a base and at least two line terminals extending from one surface of the base. A ground terminal also extends from the one surface of the base and is spaced from the two line terminals. A circuit board is mounted on another surface of the base and has electrical paths on it leading to the at least two line terminals and to the ground terminal. An overload detector is mounted on the circuit board and establishes an electrical connection between the at least two line terminals by way of the electrical paths in normal operation and establishes an electrical connection between at least one of the at least two line terminals and the ground terminal by way of the electrical paths in the event of an overload condition. A fail short may also be provided to establish a permanent electrical connection between the at least two line terminals and the ground terminal if the overload condition exceeds the rating of the overload detector.

21 Claims, 4 Drawing Sheets

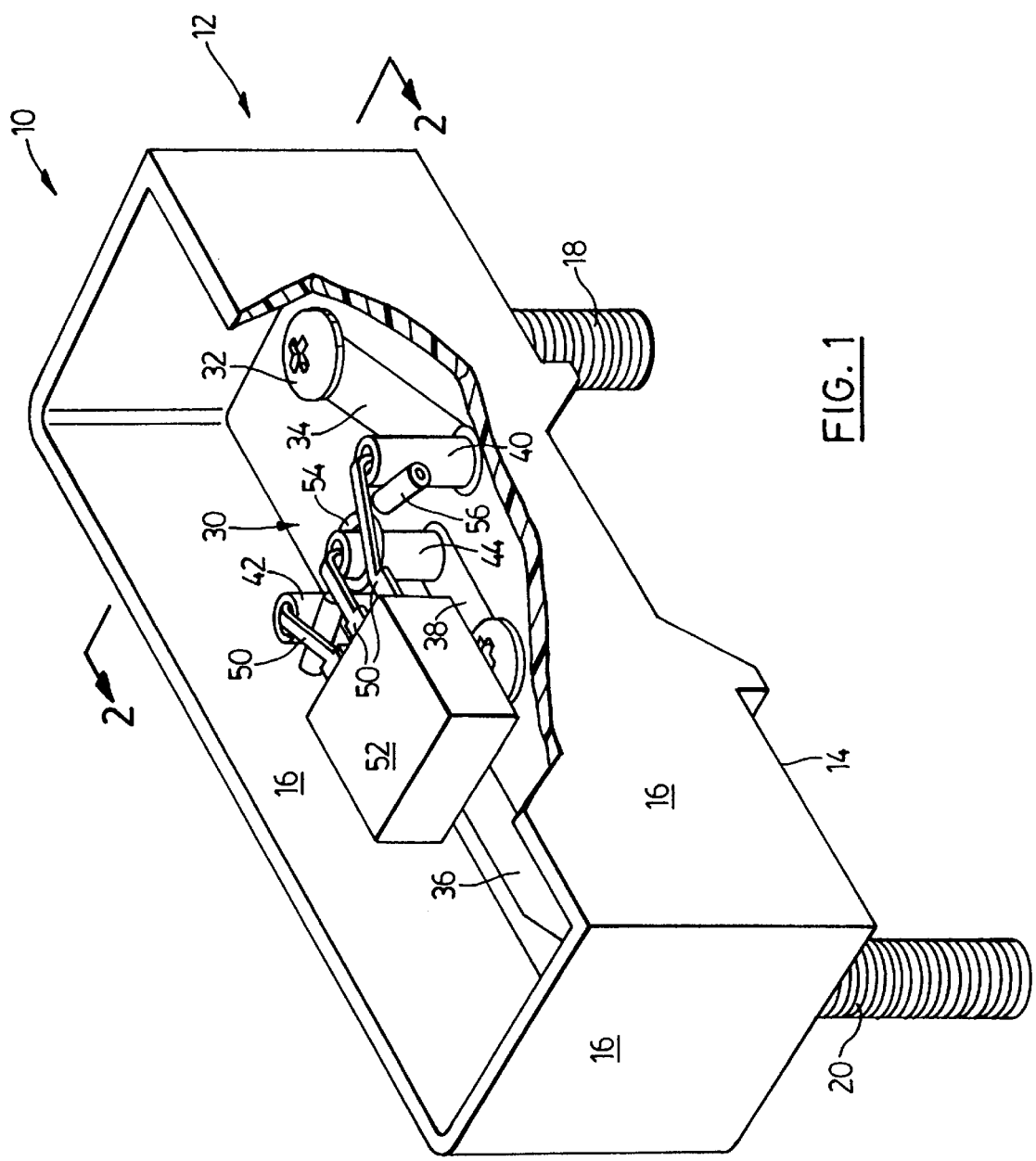

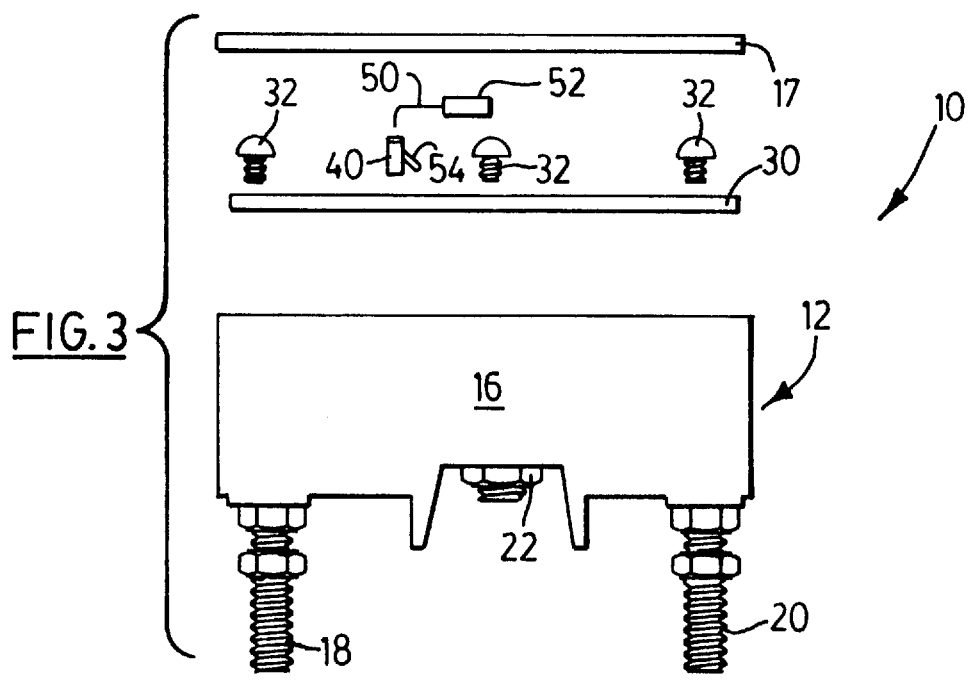
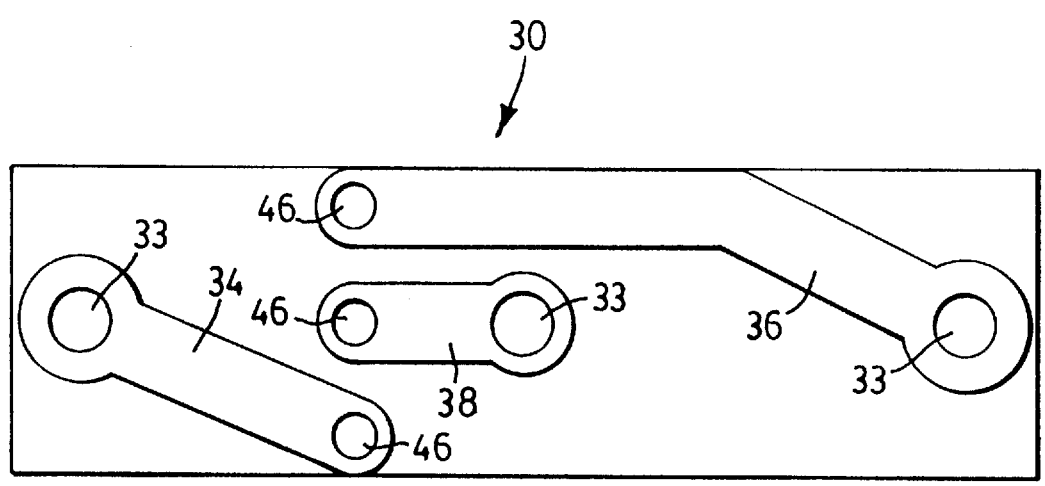

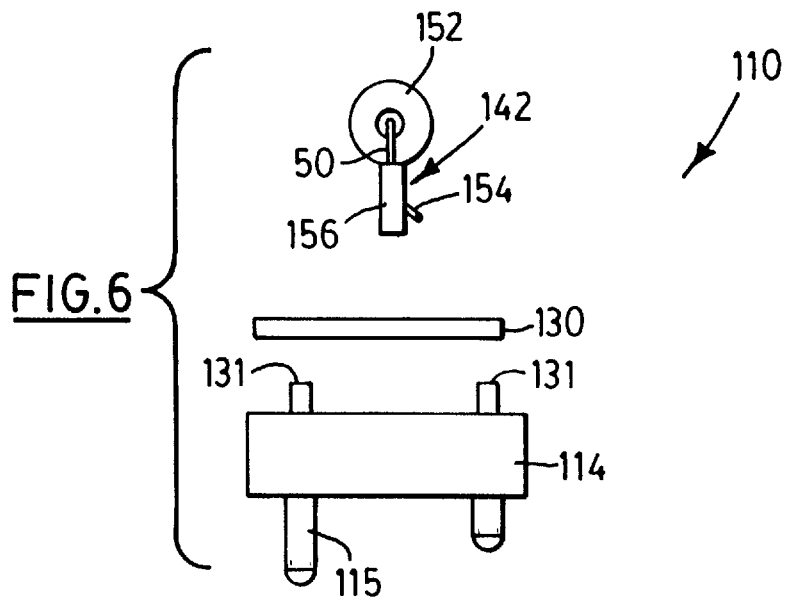
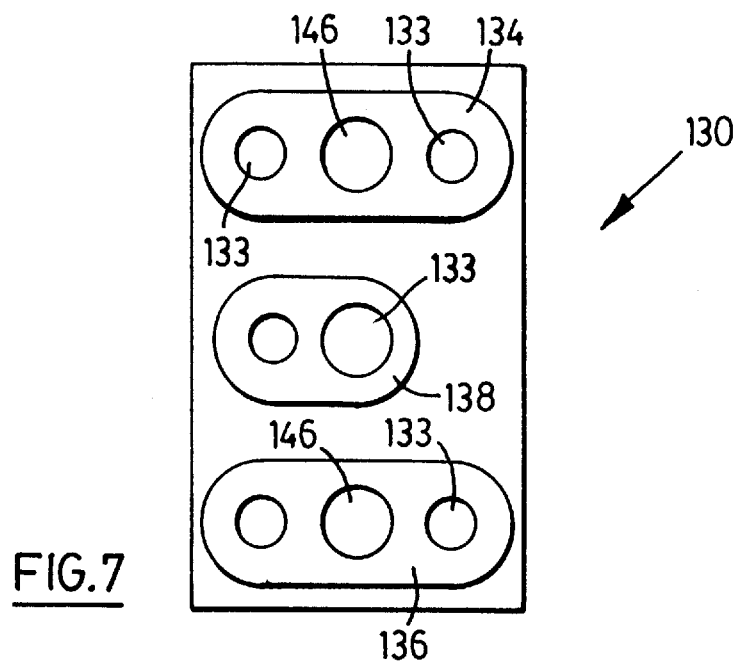

PROTECTOR

FIELD OF THE INVENTION

The present invention relates to protectors and in particular to a protector for use in a telecommunications system to terminate an electrical connection between two lines in the telecommunications system in the event of an overload condition.

BACKGROUND OF THE INVENTION

Protectors to isolate facilities and/or telecommunications equipment within the facilities from external telecommunications lines in the event of an overload condition are well known. Protectors of this nature are often located in external boxes where the telecommunication lines in the external telecommunications cable are connected to service lines leading into a facility (station protectors) and/or on protector panels within the facility where service lines are connected to lines leading to the telecommunications equipment (plug-in protectors).

Conventional station protectors include a housing having two depending terminals, connected to respective ones of the telecommunication and service lines being bridged. A ground terminal also depends from the housing and is connected to a line leading to ground. Within the housing are a pair of bulky copper busses fastened to the housing by retainers. Each buss is electrically connected to one of the two terminals. A ground buss is disposed in the housing and is electrically connected to the ground terminal. The ground buss underlies the other two busses but is electrically isolated from them by spacers formed of dielectric material. Bridging the two busses is an overload detector in the form of a gas tube. The overload detector is also electrically connected to the ground buss.

During normal operating conditions, the overload detector electrically connects the two busses while isolating the two busses from the ground buss. When an overload condition occurs, the overload detector connects the two busses to the ground buss and hence, to the ground terminal. If the overload condition passes, the overload detector resumes the electrical connection between the two busses isolating them from the ground buss. If the overload condition persists or is severe such that the current through the station protector exceeds the rating of the overload detector, the dielectric spacers vaporize establishing a permanent electrical connection between at least one of the two busses and the ground buss.

Although these protectors work satisfactorily, they are difficult to assemble resulting in increased assembly time and worker frustration. This translates directly into increased labour costs. Conventional plug-in type protectors operate in a similar manner and suffer from the same disadvantages. Accordingly improved protector designs are continually being sought.

It is therefore an object of the present invention to provide a novel protector for use in a telecommunications system.

SUMMARY OF THE INVENTION

According to one aspect of the present invention there is provided a protector to interconnect a pair of telecommunications lines in a telecommunications system comprising:

a base;

at least two terminals extending from one surface of said base, each of said terminals to be connected to a respective one of said telecommunications lines;

a ground terminal extending from said one surface to be connected to electrical ground;

a printed circuit board mounted on another surface of said base and having electrical paths leading to said at least two terminals and to said ground terminal; and an overload detector establishing an electrical connection between said at least two terminals via said electrical paths in normal operation and establishing an electrical connection between at least one of said at least two terminals and said ground terminal via said electrical paths in the event of an overload condition.

In the preferred embodiment, the overload detector is either in the form of a gas tube or an integrated circuit and establishes an electrical connection between the ground terminal and both of the at least two terminals in the event of an overload condition. It is also preferred that the protector further includes a fail short to establish a permanent electrical connection between at least one of the at least two terminals and the ground terminal if the overload condition exceeds the rating of the overload detector.

In one embodiment, the protector includes a plurality of connectors extending from the circuit board, each being electrically connected to one of the electrical paths. The connectors receive the electrical terminals of the overload detector. Preferably, the connectors are in the form of cylindrical tubes. In this embodiment, the fail short is in the form of a conductor wound around one of the tubes and has opposed free ends extending to the other tubes. The free ends of the conductor are isolated from the other tubes by insulating material designed to vaporize in the event of a severe overload condition so that the fail short connects electrically the three tubes.

According to another aspect of the present invention there is provided a method of assembling a protector to interconnect a pair of telecommunication lines in a telecommunication system, said protector including a base from which at least two terminals and a ground terminal depend and an overload detector to establish an electrical connection between said at least two terminals in normal operation and to establish an electrical connection between at least one of said at least two terminals and said ground terminal in the event of an overload condition, said method comprising the steps of:

mounting a printed circuit board having electrical traces thereon on said base; and electrically connecting said traces to said at least two terminals and to said ground terminal as well as to said overload detector.

The present invention provides advantages in that the protector can be manufactured and assembled in a much faster and easier manner than prior art protectors. This reduces worker frustration and decreases labour costs.

BRIEF DESCRIPTION OF THE DRAWINGS

Embodiments of the present invention will now be described more fully with reference to the accompanying drawings in which:

FIG. 1 is perspective view of a station protector in accordance with the present invention;

FIG. 3 is an exploded side elevational view of the station protector of FIG. 1;

FIG. 4 is an enlarged top plan view of a printed circuit board forming part of the station protector of FIG. 1;

FIG. 6 is an exploded side elevational view of the plug-in protector of FIG. 5; and FIG. 7 is an enlarged top plan view of a printed circuit board forming part of the plug-in protector of FIG. 5.

DESCRIPTION OF THE PREFERRED EMBODIMENTS

Figure 5:
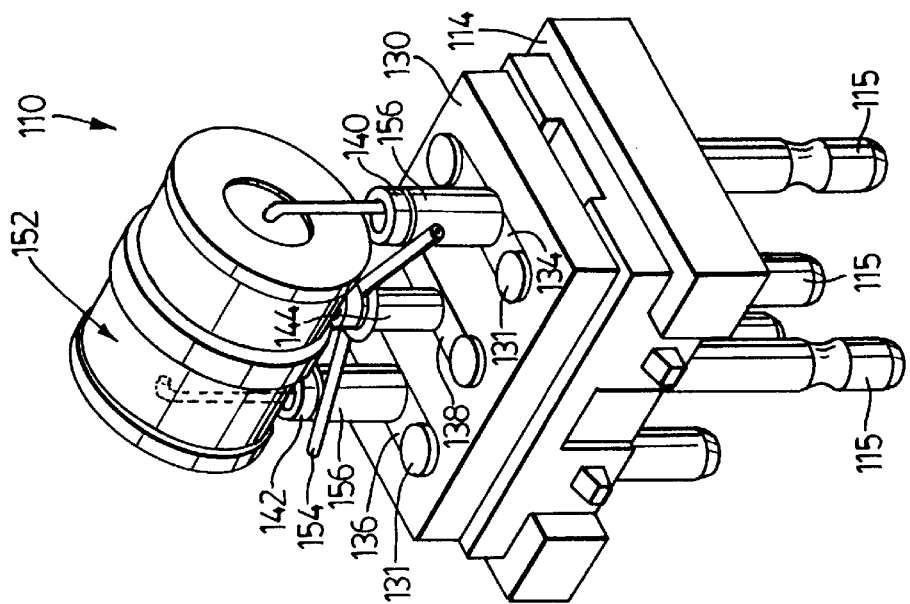
FIG. 5 is a perspective view of a plug-in protector in accordance with the present invention.

Referring now to FIGS. 1 to 4, a protector for use in a telecommunications system to establish an electrical connection between two lines is shown and is generally indicated to by reference numeral 10. In this particular example, the protector is in the form of a station protector to interconnect a telecommunications line in an external telecommunications cable to a service line extending to a facility. As can be seen, the station protector 10 includes an enclosed, generally rectangular housing 12 having a base 14, upright walls 16 about the periphery of the base 14 and a top 17. The top 17 is removable to expose the interior of the housing 12. A pair of line terminals 18 and 20 depend from opposed ends of the base 14. One of the terminals 18 is to be connected to the telecommunications line while the other terminal 20 is to be connected to the service line. A ground terminal 22 is also secured to the base 12 midway between the terminals 18 and 20 and extends to one side of the housing 12. The ground terminal 22 is to be connected to a ground post leading to electrical ground.

Figure 2:
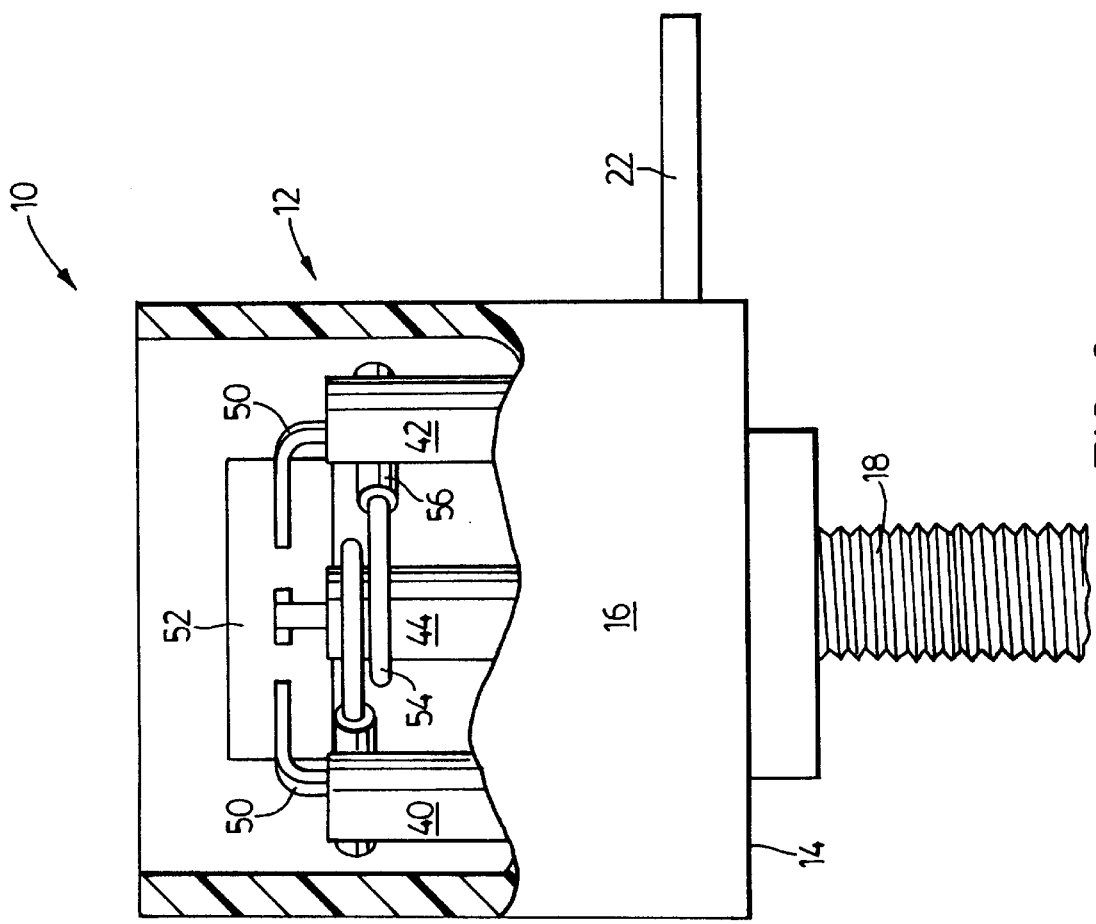
FIG. 2 is cross-sectional view of the station protector of FIG. 1 taken along line 2—2.

Surface mounted on the base 14 within the housing 12 is a printed circuit board 30 (best seen in FIGS. 2 and 4). The printed circuit board is secured to the base 14 by a plurality of fasteners 32 passing through apertures 33 provided in the printed circuit board 20. Three copper traces 34, 36 and 38, each defining an electrical path are on the printed circuit board. Copper trace 34 has one end electrically connected to the terminal 18 by way of one of the fasteners 32 and another end electrically connected to an upright metal tubular connector 40. Similarly, copper trace 36 has one end electrically connected to the terminal 20 by way of another of the fasteners 32 and another end electrically connected to an upright metal tubular connector 42. Copper trace 36 has one end electrically connected to the ground terminal 22 by way of yet another fastener 32 and another end electrically connected to a third upright metal tubular connector 44 positioned between connectors 40 and 42. The three connectors are accommodated by apertures 46 provided in the printed circuit board 30 and are arranged in a row. The connectors accommodate the pins 50 of an integrated circuit overload protector 52 such as that manufactured by Teccor of Texas under part number P152C.

A fail short 54 is associated with the tubular connectors 40, 42 and 44 and is in the form of a conductor wound around the central tubular connector 44. The two free ends of the fail short 54 are positioned adjacent the connectors 40 and 42 and are covered by insulating material 56 to isolate electrically the fail short 54 and the connectors 42 and 44.

The operation of the station protector 10 will now be described. During normal operating conditions, the overload detector 52 electrically connects the terminals 18 and 20 by establishing an electrical connection between copper traces 34 and 36 while isolating the terminals from the ground terminal 22. When an overload condition occurs, the overload detector 52 connects the terminals 18 and 20 to the ground terminal 22 by establishing an electrical connection between copper trace 38 and copper traces 34 and 36. If the overload condition passes, the overload detector 52 resumes the electrical connection between the terminals 18 and 20 while isolating them from the ground terminal 22. If the overload condition persists or is severe such that the current through the station protector 10 exceeds the rating of the overload detector 52, the insulating material 56 covering the free ends of the fail short 54 vaporizes establishing a permanent electrical connection between connectors 40, 42 and 44 and hence, between the terminals 18 and 20 and the ground terminal 22. In this case, the station protector 10 must be replaced in order to reestablish the desired connection between the telecommunication and service lines.

During manufacture of the station protector 10, the connectors 40 to 44 are inserted into the apertures 46 formed in the printed circuit board 30 and are soldered in place to connect them electrically to the copper traces 34 to 38. The fail short 54 is then wound about the connector 44 and positioned to contact connectors 42 and 44. The pins 50 of the overload protector 52 are then inserted into the connectors and soldered. With the printed circuit board 30 assembled in this manner, it can be placed in the housing 12 and secured to the base 14 by the fasteners 32, allowing the protector 10 to be assembled quickly and with ease. If desired, the overload protector 52 can be soldered to the connectors 40 to 44 after the printed circuit board 30 has been placed in the housing and secured to the base by the fasteners.

Referring now to FIGS. 5 to 7, another embodiment of a protector is shown and is generally indicated to by reference numeral 110. In this embodiment like reference numerals will be used to indicate like components of the previous embodiment with a "100" added for clarity. The protector 110 is of the plug-in type and is designed to plug into a terminal panel such as that disclosed in U.S. Pat. No. 5,044,962 issued on Sep. 3, 1991 and assigned to the assignee of the present application, to establish an electrical connection between telecommunications equipment in a facility and a service line. The plug-in protector 110 includes a base 114 formed of insulating material. Depending from the base are a plurality of terminal pins 115.

Surface mounted on the base 114 is a printed circuit board 130. The printed circuit board is retained by studs 131 on the base which pass through apertures 133 provided in the printed circuit board. The printed circuit board 130 includes three copper traces 134, 136 and 138, each defining an electrical path. Copper trace 134 electrically connects two of the terminal pins to an upright metal tubular connector 140. Similarly, copper trace 136 electrically connects two of the terminal pins to an upright metal tubular connector 142 while copper trace electrically connects a ground terminal pin to a third upright metal tubular connector 144 positioned between connectors 140 and 142. The three connectors are received in apertures 146 provided in the printed circuit board 130 and are arranged in a row. A gas tube overload protector 152 such as that manufactured by Joslyn of California under part number 2026-35-C2 includes a pair of wire terminals which are accommodated by the connectors 140 and 142. The third terminal of the overload detector 152 is in the form of a metal ring centrally positioned between the wire terminals and contacts the connector 144.

A fail short 154 is associated with the tubular connectors. The fail short is in the form of a conductor wound around the central tubular connector 144. The two free ends of the fail short 154 contact a respective one of the two connectors 140 and 142 respectively. Unlike the previous embodiment, the ends of the fail short 154 are electrically isolated from the connectors 140 and 142 by insulating material 156 surrounding the connectors. As one of skill in the art will appreciate, the protector 110 is also easily assembled.

The present invention provides advantages in, that the design of the protectors allows them to be manufactured quickly and easily as compared to prior art designs. This of course allows production to be increased while reducing labour costs.

Although the station protector has been shown to accommodate an integrated circuit overload protector while plug-in protector has been shown to accommodate a gas tube overload detector, it should be realized that each protector can accommodate other types of overload protectors. It should also be appreciated by those of skill in the art that variations and modifications may be made to the present invention without departing from the spirit and scope thereof as defined by the appended claims.

We claim:

1. A protector to interconnect a pair of telecommunication lines in a telecommunications system comprising:

a base;

at least two terminals extending from one surface of said base, each of said terminals to be connected to a respective one of said telecommunications lines;

a ground terminal extending from said one surface to be connected to electrical ground;

a printed circuit board mounted on another surface of said base and having electrical paths thereon leading to said at least two terminals and to said ground terminal;

a plurality of conductive tubular connectors extending from said printed circuit board, each of said tubular connectors being in electrical communication with a respective one of said electrical paths; and an overload detector having terminals in electrical contact with said tubular connectors, said overload detector establishing an electrical connection between said at least two terminals via said tubular connectors and said electrical paths in normal operation and establishing an electrical connection between at least one of said at least two terminals and said ground terminal via said tubular connectors and said electrical paths in the event of an overload condition.

2. A protector as defined in claim 1 wherein said overload detector establishes an electrical connection between the ground terminal and both of said at least two terminals in the event of said overload condition.

3. A protector as defined in claim 2 further comprising a fail short to establish a permanent electrical connection between at least one of said at least two terminals and the ground terminal if the overload condition exceeds the rating of said overload detector.

4. A protector as defined in claim 3 wherein said overload detector is of the gas tube type and includes a pair of wire terminals, each of said wire terminals being received by a respective one of said tubular connectors, said overload detector further including a ring terminal contacting the tubular connector in electrical communication with said ground terminal.

5. A protector as defined in claim 3 wherein said fail short is in the form of a conductor wound around said tubular connector in electrical communication with the electrical path leading to said ground terminal and having opposed ends extending to the tubular connectors in electrical communication with the electrical paths leading to said at least two terminals, said opposed ends being isolated from said tubular connectors in electrical communication with the electrical paths leading to said at least two terminals by insulating material designed to vaporize in the event of a severe overload condition.

6. A protector as defined in claim 5 wherein said insulating material covers the opposed free ends of said conductor.

7. A protector as defined in claim 5 wherein said insulating material covers said tubular connectors in electrical communication with the electrical paths leading to said at least two terminals.

8. A protector as defined in claim 3 wherein said overload detector is in the form of an integrated circuit having a plurality of terminals, each of said terminals being received by a respective one of said tubular connectors.

9. A protector as defined in claim 8 wherein said tubular connectors are generally cylindrical.

10. A protector as defined in claim 8 wherein said integrated circuit is spaced from said printed circuit board.

11. A protector as defined in claim 1 wherein said base is surrounded about its periphery by upright sidewalls and wherein a top overlies said sidewalls to form an enclosure accommodating said printed circuit board and said overload detector.

12. A protector as defined in claim 11 further comprising a fail short to establish a permanent electrical connection between at least one of said at least two terminals and the ground terminal if the overload condition exceeds the rating of said overload detector.

13. A protector as defined in claim 12 wherein said overload detector establishes an electrical connection between the ground terminal and both of the at least two terminals in the event of said overload condition.

14. A protector as defined in claim 13 wherein said overload detector is in the form of an integrated circuit having a plurality of terminals, each of said terminals being received by a respective one of said tubular connectors.

15. A protector as defined in claim 14 wherein said tubular connectors are generally cylindrical.

16. A protector as defined in claim 14 wherein said integrated circuit is spaced from said printed circuit board.

17. A protector as defined in claim 13 wherein said fail short is in the form of a conductor wound around said tubular connector in electrical communication with the electrical path leading to said ground terminal and having opposed ends extending to the tubular connectors in electrical communication with the electrical paths leading to said at least two terminals, said opposed ends being isolated from said tubular connectors in electrical communication with the electrical paths leading to said at least two terminals by insulating material designed to vaporize in the event of a severe overload condition.

18. A protector as defined in claim 17 wherein said insulating material covers the opposed fee ends of said conductor.

19. A protector as defined in claim 17 wherein said insulating material covers said tubular connectors in electrical communication with the electrical paths leading to said at least two terminals.

20. A method of assembling a protector to interconnect a pair of telecommunications lines in a telecommunications system, said protector including a base from which at least two terminals and a ground terminal depend and an overload detector to establish an electrical connection between said at least two terminals in normal operation and to establish an electrical connection between at least one of said at least two terminals and said ground terminal in the event of an overload condition, said method comprising the steps of:

mounting a printed circuit board having electrical traces thereon on said base;

extending conductive tubular connectors from said printed circuit board, each of said tubular connectors being in electrical communication with a respective one of said electrical traces;

electrically connecting said traces to said at least two terminals and to said ground terminal; and electrically connecting terminals of said overload detector to said tubular connectors.

21. The method of claim 20 wherein said electrical traces are electrically connected to said at least two terminals and to said ground by conductive fasteners passing through said printed circuit board.

* * * * *